(12) United States Patent
Wu et al.

(10) Patent No.: US 7,895,613 B2
(45) Date of Patent: Feb. 22, 2011

(54) FEEDING DEVICE FOR A SLOT-IN OPTICAL DISK DRIVE

(75) Inventors: Jen-Chen Wu, Taoyuan (TW); Guo-Wei Huang, Taoyuan (TW)

(73) Assignee: Quanta Storage Inc., Taoyuan County (TW)

( * ) Notice: Subject to any disclaimer, the term of this patent is extended or adjusted under 35 U.S.C. 154(b) by 758 days.

(21) Appl. No.: 11/902,090

(22) Filed: Sep. 19, 2007

(65) Prior Publication Data

US 2008/0104623 A1 May 1, 2008

(30) Foreign Application Priority Data

Oct. 27, 2006 (TW) .............................. 95139956 A

(51) Int. Cl.
*G11B 17/04* (2006.01)
(52) U.S. Cl. ..................................... 720/689; 720/619
(58) Field of Classification Search ......... 720/619–625, 720/689, 691–694, 706–714
See application file for complete search history.

(56) References Cited

U.S. PATENT DOCUMENTS 6,839,898 B2 * 1/2005 Saji et al. .................... 720/619

* cited by examiner

*Primary Examiner*—Thang V Tran
*Assistant Examiner*—Nathan A Danielsen
(74) *Attorney, Agent, or Firm*—Bacon & Thomas, PLLC

(57) ABSTRACT

A feeding device of a slot-in disk drive is disposed in a casing of the disk drive and includes a traverse. A bolt is disposed on and protrudes from a side of the traverse. A flange extends from the side of the traverse near the bolt. A pre-stressed piece is a bended elastic body. One end of the pre-stressed piece is fixed to the flange of the traverse, and the other end is fixed to the casing. The pre-stressed piece presses the traverse downward by its elastic force. A slider includes a protrusion with a groove formed on a side of the protrusion. The bolt is inserted into and slides within the groove. The groove includes an unloading end, an inserting portion and a loading end. An opening is formed on the upper surface of the slider near the inserting portion for reducing the thickness of the disk drive.

8 Claims, 3 Drawing Sheets

FEEDING DEVICE FOR A SLOT-IN OPTICAL DISK DRIVE

This application claims the benefit of Taiwan application Serial No. 95139956, filed Oct. 27, 2006, the subject matter of which is incorporated herein by reference.

BACKGROUND OF THE INVENTION

1. Field of the Invention

The invention relates in general to a slot-in disk drive, and more particularly to a slot-in disk drive with a feeding device for driving a traverse to ascend or descend to position for loading or unloading a compact disk.

2. Description of the Related Art

The recent trend of the portable electronic device is toward lightweight, compact size and comfort in using the device. Therefore, it is very important to avoid vibration of the device in operation, decrease discomfort in using the device and reduce the thickness of the device.

As shown in FIG. 1, a slider 2 is disposed in a conventional slot-in disk drive 1 according to Taiwan Patent No. 093114433. The slider 2 moves back and forth to drive the movement of a bolt 5 inserted in a groove 3 formed on the slider 2. The bolt 5 is connected with a traverse 4. As a result, under the restraint of a restraining pole 6, the traverse 4 ascends along the grove 3. Then, a spindle motor 7 disposed on the traverse 4 is engaged with and rotates a compact disk D at a high speed, for reading or writing data on the compact disk D. Or, under the restraint of a restraining pole 6, the traverse 4 descends accordingly. Then, the compact disk D is separated from the traverse 4 and ejected from the disk drive.

Vibration occurs when the spindle motor 7 is engaged with and rotates the compact disk D at a high speed. The vibration is transmitted to the bolt 5 through the spindle motor 7 and the traverse 4. The groove 3 and the bolt 5 are inflexible. Therefore, the vibration generated by the compact disk D can not be suppressed and results in the vibration of the disk drive 1. Also, the vibration makes the user feel uncomfortable. To prevent the disk drive from being affected by the vibration, an elastic buffer pad 8 is disposed on one end of the groove 3 to absorb the vibration.

However, the elastic buffer pad 8 can not be engaged with the bolt 5 tightly for enabling the bolt 5 to slide back and forth smoothly. Therefore, the elastic buffer pad 8 can not suppress the vibration of the disk drive effectively. Furthermore, the disk drive has to have a specific thickness so that the compact disk D can rotates without being scraped. The slider 2 also has to have a specific thickness. Otherwise, the groove 3 can not have enough height to enable the compact disk D to be engaged with or separated from the traverse 4. As a result, the thickness of the conventional slot-in disk drive can not be reduced further. Therefore, the conventional slot-in disk drive still has unsolved problems in its feeding device.

SUMMARY OF THE INVENTION

The invention is directed to a feeding device of a slot-in disk drive. A pre-stressed piece is used for pressing a traverse. As a result, a bolt on the traverse slides closely along a groove of a slider, for suppressing vibration of the disk drive.

The invention is directed to a feeding device of a slot-in disk drive. The thickness of the slider is decreased for reducing the thickness of the disk drive. As a result, the slot-in disk drive occupies less volume.

The invention is directed to a feeding device of a slot-in disk drive. The pre-stressed piece is used for enabling the bolt to slide closely along the groove and preventing the bolt from sliding out from the groove.

According to the present invention, a feeding device of a slot-in disk drive is provided. The feeding device of the disk drive is disposed in a casing of the disk drive and includes a traverse with a bolt disposed on a side of the traverse. A flange extends outward from the side of the traverse near the bolt. A pre-stressed piece is a bended elastic body. One end of the pre-stressed piece is fixed to the flange of the traverse, and the other end is fixed to the casing. The pre-stressed piece presses the traverse downward by its elastic force. A slider includes a protrusion with a groove formed on a side of the protrusion. The bolt is inserted into and slides within the groove. The groove includes an unloading end, an inserting portion and a loading end. The groove forms an opening on the upper surface of the slider near and above the inserting portion.

The present invention reduces the thickness of the disk drive by decreasing the thickness of the slider. The opening is formed accordingly. Meanwhile, the pre-stressed piece is used for enabling the bolt to slide closely along the groove and prevent the bolt from sliding out from the opening. Therefore, the malfunction of the disk drive is avoided, and vibration of the traverse is suppressed. Also, noise due to the vibration of the bolt and groove is reduced.

The invention will become apparent from the following detailed description of the preferred but non-limiting embodiments. The following description is made with reference to the accompanying drawings.

DETAILED DESCRIPTION OF THE INVENTION

A preferred embodiment and accompanying drawings are provided to illustrate the present invention and the skill and effect thereof for achieving the abovementioned objective.

Figure 1:
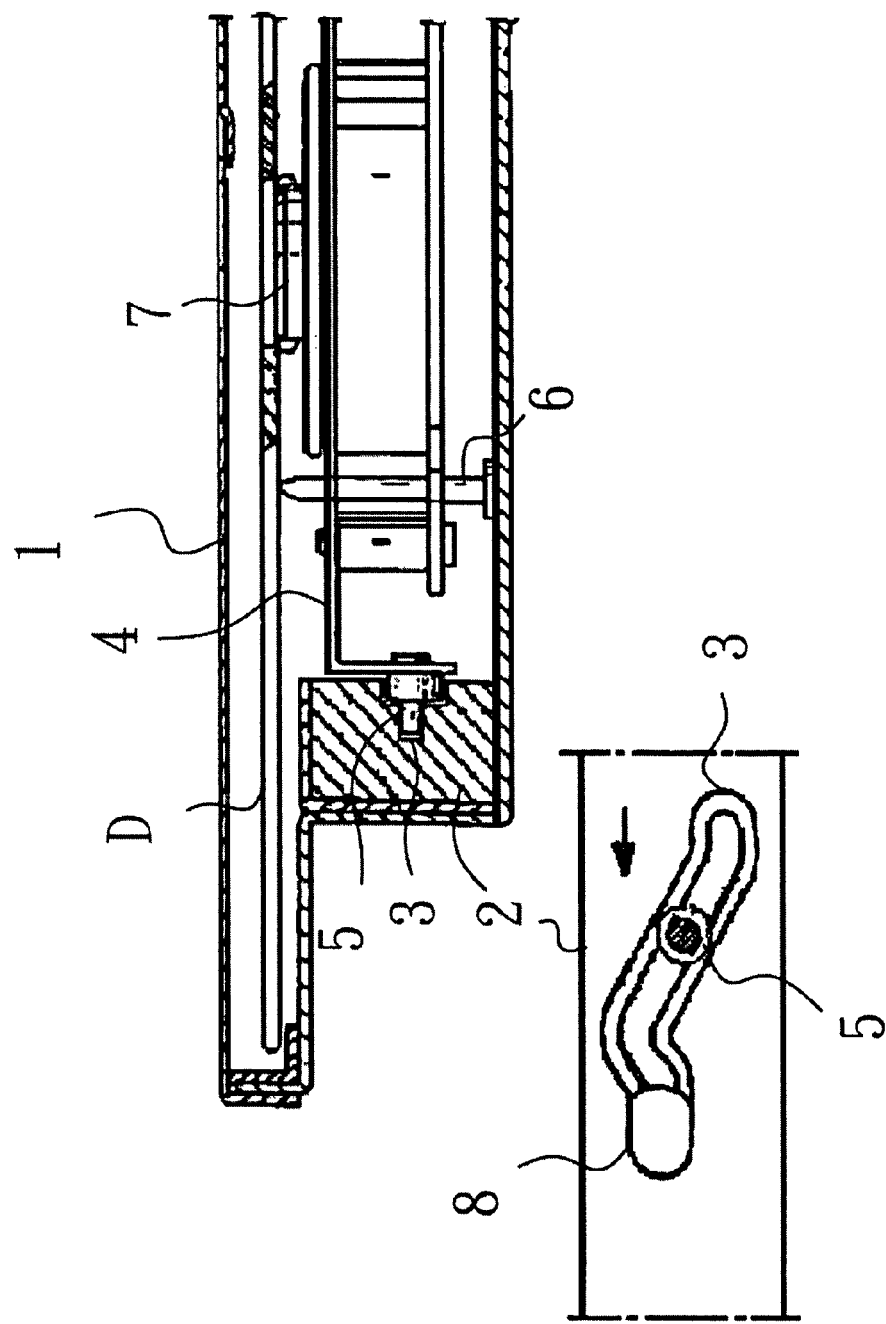
FIG. 1 is a cross-sectional view of a conventional slot-in disk drive.
Figure 2:
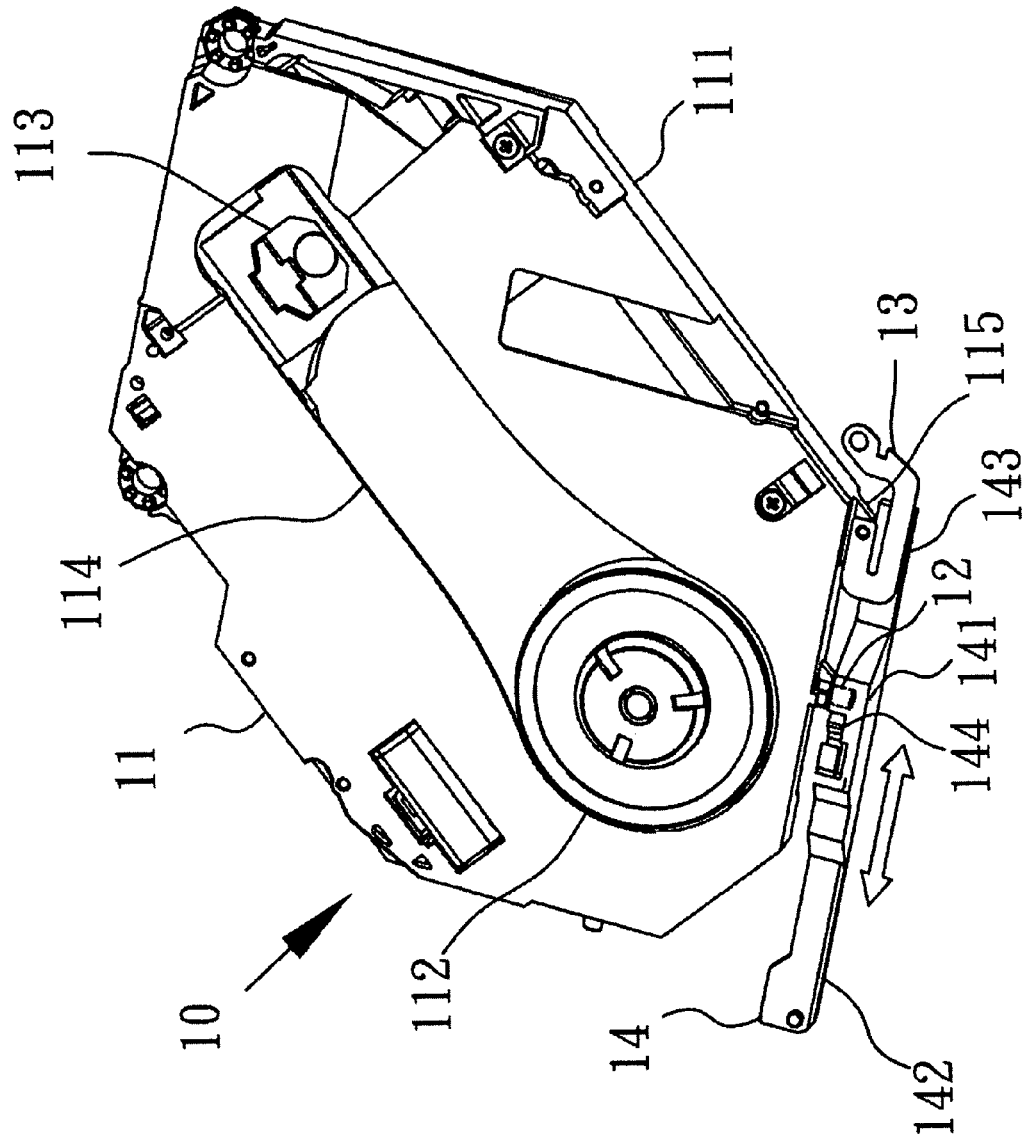
FIG. 2 is a three-dimensional view of a feeding device of a slot-in disk drive according to the present invention.

Please referring to FIG. 2, a feeding device 10 of a slot-in disk drive according to the present invention is illustrated. The feeding device 10 includes a traverse 11, a bolt 12, a pre-stressed piece 13 and a slider 14. The pre-stressed piece 13 presses the traverse 11, so that the bolt 12 disposed on the traverse 11 drives the traverse 11 to ascend or descend according to the drive of the slider 14.

The traverse 11 is a plate and includes a main body 111, a spindle motor 112, a pickup head 113 and a hole 114. The hole 114 is formed at the center of the main body 111. The spindle motor 112 protrudes from one end of the hole 114. The pickup head 113 slides within the rest of the hole 114. A bolt 12 is disposed on and vertically protrudes from one side along the same side of the main body 111 as the spindle motor 112. The bolt 12 is a small column extending along the horizontal direction of the traverse 11. The main body 111 includes a flange 115 extending along the same side of the main body 111 as the bolt 12.

The pre-stressed piece 13 is an elastic body and bends along the external shape of the traverse 11 without affecting the ascending and descending of the traverse 11. One end of the pre-stressed piece 13 is fixed to the flange 115, and the other end is fixed to a casing 15 (please referring to FIG. 3) of the disk drive. The pre-stressed piece 13 presses downward the traverse 11 by its own elastic force. As a result, a downward force is applied to the traverse 11.

The slider 14 is disposed on the side of the traverse 11 near the bolt 12. The slider 14 is a pole and includes a protrusion 141, a driving end 142 and an extending end 143. The driving end 142 and the extending end 143 are respectively located at two ends of the slider 14. The driving end 142 is driven by a power source (not shown in FIG. 2) of the disk drive, so that the slider 14 moves along the direction of the arrow in FIG. 2. The extending end 143 extends under the pre-stressed piece 13, so that the extending end 143 does not affect the movement of the pre-stressed piece 13. Furthermore, the protrusion 141 protrudes from the center of the slider 14. A groove 144 is concaved inward and formed on a side of the protrusion 14 facing the traverse 11. The bolt 12 is inserted into and slides within the groove 144.

Figure 3:
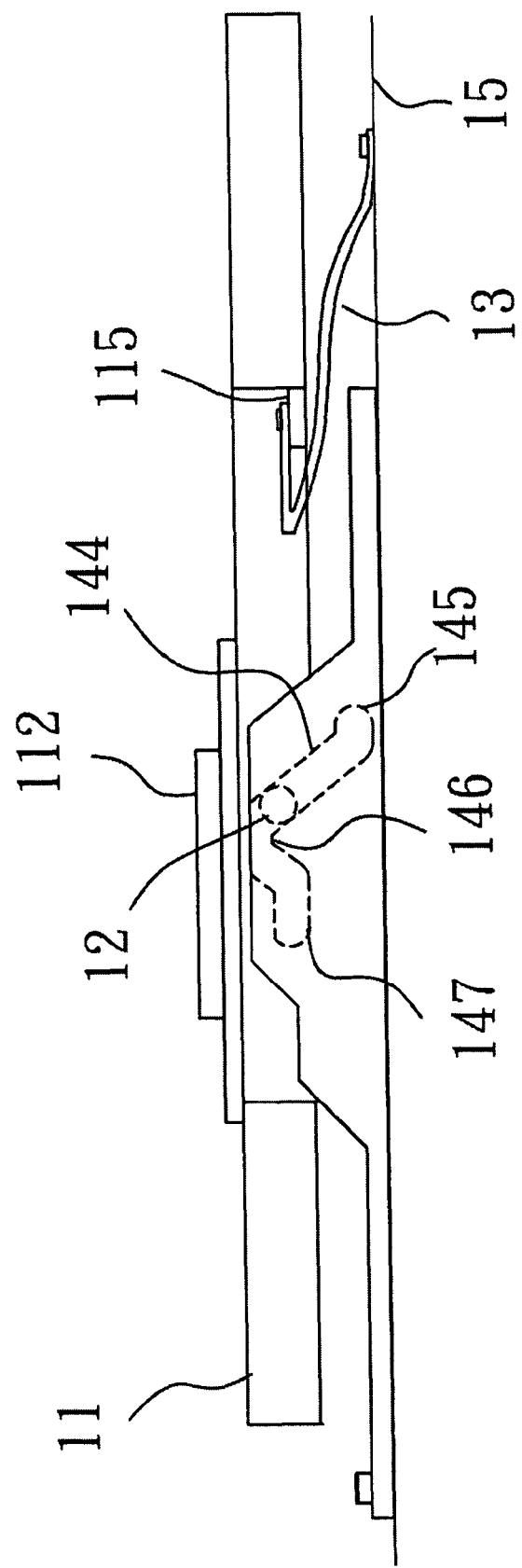
FIG. 3 is a lateral view of the feeding device of the slot-in disk drive according to the present invention.

Please refer to FIG. 3. The groove 144 is a long groove descending and ascending continuously. The groove 144 includes an unloading end 145, an inserting portion 146 and a loading end 147. The unloading end 145 is located lowest for ejecting the compact disk. The inserting portion 146 is highest, and the traverse 11 inserts the spindle motor 112 into a center hole of a compact disk at this position. Also, the thickness of the groove 144 is reduced near the inserting portion 146, so the groove 144 forms an opening upward near the inserting portion 146 accordingly. As a result, the disk drive becomes thinner. The loading end 147 is slightly lower than the inserting portion 146. The inserting portion 146 prevents the bolt 12 at the loading end 147 from sliding back to the unloading end 145. The traverse 11 rotates the compact disk at a specific height. As a result, the compact disk does not contact other components of the disk drive and is prevented from being damaged.

In order to reduce the thickness of the slot-in disk drive, the thickness of the groove 144 is decreased in the present invention. As a result, the groove 144 has an opening near and above the inserting portion 146. Accordingly, the bolt 12 easily slides out from the groove 144 near the inserting portion 146 and is stuck with the traverse 11, which results in malfunction of the disk drive. Therefore, the pre-stressed piece 13 is used in the present invention for pressing the traverse 11. One end of the pre-stressed piece 13 is fixed to the flange 115, and the other end is fixed to the casing 15 of the disk drive. The higher the traverse 11 ascends, the greater the deformation of the pre-stressed piece 13 is. As a result, the elastic force of the pre-stressed piece 13 applied to the bolt 12 is larger, so that the bolt 12 slides closely along a lower edge of the groove 144.

When the slider 14 is driven by the power source of the disk drive to load the compact disk, the bolt 12 slides along the groove 144 and moves from the unloading end 145 toward the inserting portion 146. The traverse 11 ascends gradually. When the bolt 12 passes through the opening above the inserting portion 146, the pre-stressed piece 13 presses the traverse 11 downward. As a result, the bolt 12 slides closely along the lower edge of the groove 144, so the bolt 12 does not slide out from the groove 144. When the bolt 12 passes the highest inserting portion 146, the spindle motor 112 on the traverse 11 is inserted in the center hole of the compact disk. Then, the bolt 12 enters the loading end 147, and the traverse 11 rotates the compact disk at a specific height. Also, the inserting portion 146 prevents the bolt 12 from sliding back to the unloading end 145. On the other hand, when the slider 14 moves toward an opposite direction under the drive of the power source of the disk drive, the unloading process is opposite to the above loading process.

Therefore, in the slot-in disk drive of the present invention, the pre-stressed piece presses the traverse, so that the bolt on the traverse slides closely along the lower edge of the groove. The vibration of the traverse is suppressed, and the noise due to the vibration of the bolt 12 and the groove 144 is reduced. Meanwhile, the thickness of the slider is decreased for further reducing the thickness of the disk drive. The opening is formed accordingly, but the bolt is still able to slide closely along the groove without sliding out from the groove. Therefore, malfunction of the disk drive is avoided.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A feeding device disposed in a casing of a slot-in disk drive, the feeding device comprising:
    a traverse with a bolt protruding from a side of the traverse;
    a pre-stressed piece with one end fixed to the traverse and the other end fixed to the casing; and
    a slider with a groove, the bolt inserted into and sliding within the groove;
    wherein a flange extends from the traverse, one end of the pre-stressed piece is fixed to the flange, and the flange extends outward from a side of the traverse.

2. The feeding device according to claim 1, wherein the flange extends outward from the same side of the traverse as the bolt.

3. The feeding device according to claim 1, wherein the pre-stressed piece is an elastic body.

4. The feeding device according to claim 3, wherein the pre-stressed piece presses the traverse downward by its elastic force.

5. The feeding device according to claim 4, wherein the pre-stressed piece is bended.

6. The feeding device according to claim 1, wherein a groove is formed on a side of the slider facing the traverse, the groove forming an opening on an upper surface of the slider.

7. The feeding device according to claim 6, wherein the slider comprises a protrusion with the groove formed on a side of the protrusion, the groove forming the opening on an upper surface of the protrusion.

8. The feeding device according to claim 6, wherein the groove comprises an unloading end, an inserting portion and a loading end, the groove forming the opening on an upper surface of the slider near the inserting portion.

* * * * *